(12) United States Patent
Quinn

(10) Patent No.: US 6,667,258 B2
(45) Date of Patent: Dec. 23, 2003

(54) ZINC PHOSPHATE GLASS COMPOSITIONS

(75) Inventor: Candace Jo Quinn, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/041,809

(22) Filed: Jan. 4, 2002

(65) Prior Publication Data

US 2002/0137620 A1 Sep. 26, 2002

Related U.S. Application Data

(60) Provisional application No. 60/262,905, filed on Jan. 19, 2001.

(51) Int. Cl.[7] .............................. C03C 3/17; C03C 3/16; C03C 13/00; C08K 3/40
(52) U.S. Cl. ............................. 501/48; 501/32; 501/45; 524/494
(58) Field of Search .............................. 501/45, 46, 47, 501/48, 32; 524/494

(56) References Cited

U.S. PATENT DOCUMENTS

| | | | |
|---|---|---|---|
| 4,261,751 A | * | 4/1981 | Nakamura et al. ............ 501/42 |
| 4,874,724 A | | 10/1989 | Beall et al. |
| 4,920,081 A | | 4/1990 | Beall et al. |
| 4,940,677 A | | 7/1990 | Beall et al. |
| 4,996,172 A | | 2/1991 | Beall et al. |
| 5,021,366 A | * | 6/1991 | Aitken ........................ 501/45 |
| 5,043,369 A | | 8/1991 | Bahn et al. |
| 5,071,795 A | | 12/1991 | Beall et al. |
| 5,252,523 A | | 10/1993 | Beall et al. |
| 5,286,683 A | | 2/1994 | Aitken |
| 5,330,940 A | | 7/1994 | Aitken et al. |
| 5,367,012 A | | 11/1994 | Aitken et al. |
| 5,668,066 A | * | 9/1997 | Oguma et al. ................ 501/45 |
| 5,711,779 A | | 1/1998 | Havewala et al. |
| 5,997,965 A | | 12/1999 | Shimazu et al. |
| 6,103,810 A | | 8/2000 | Frayer et al. |

OTHER PUBLICATIONS

"Glass–Polymer Melt Blends," Quinn, CJ et al., *Polymeric Materials Encyclopedia,* vol. 4, F–G, 1996 CRC Press, Inc., pp. 2766–2777.

* cited by examiner

*Primary Examiner*—David Sample
*Assistant Examiner*—Elizabeth Bolden
(74) *Attorney, Agent, or Firm*—Siwen Chen

(57) ABSTRACT

Disclosed is a zinc phosphate glass consisting essentially, expressed in terms of mole percent on the oxide basis, of 31–34% $P_2O_5$, 0–2% $Al_2O_3$, 5–11% $Li_2O$, 5–13% $Na_2O$, 3–7% $K_2O$, with $Li_2O+Na_2O+K_2O$ being 10–28%, 20–45% ZnO, 0–10% CaO, 0–10% BaO, 0–10% SrO, with CaO+BaO+SrO being 3–12%, and 0–2% $SiO_2$, said glass exhibiting a stable glass transition temperature below 450° C., a working temperature below 500° C., and a water durability of no more than $5\times10^{-7}$ g/cm$^2$/min after immersion in water at 95° C. for 24 hours. The low-temperature glass of the present invention is particularly useful for producing glass/polymer blends. Glass/polymer blends containing the glass of the present invention are also disclosed.

9 Claims, 1 Drawing Sheet

ZINC PHOSPHATE GLASS COMPOSITIONS

CROSS REFERENCED APPLICATIONS

This application claims benefit of U.S. provisional application, Ser. No. 60/262,905, filed Jan. 19, 2001, entitled "Zinc Phosphate Glass Compositions," by Candace Jo Quinn.

FIELD OF THE INVENTION

The present invention relates to low glass transition temperature zinc phosphate glass compositions and glass/polymer blends containing the same. More particularly, the present invention relates to tin-free zinc phosphate glass compositions with a low and reproducible melt-to-melt glass transition temperature and glass/polymer blends containing the same.

BACKGROUND OF THE INVENTION

In recent years, composite bodies consisting of inorganic glasses exhibiting low glass transition temperature ($T_g$) and organic polymers that exhibit the combined properties of inorganic glasses and polymers have been disclosed. For example, U.S. Pat. No. 3,732,181 describes several general methods by which glass in the form of fibers, films, flakes, powder, or sheets is combined with a polymer to form a composite mixture which can be formed into a desired configuration through a variety of shaping means. As disclosed therein, the ratio of polymer-to-glass may range from 0.1:99.9 to 99.9:0.1 on a volume basis, but more typically, about 5–66% by volume. This reference also discloses three broad glass compositions exhibiting properties which render the glasses suitable for use in glass-plastic composite articles, namely:

$PbO+P_2O_5 \geq 95$ mol %, wherein PbO constitutes 20–80 mol %;

$PbO+R_2O$ (alkali metal oxides)$\geq 95$ mol %, wherein PbO comprises 5–60 mol %, $R_2O$ constitutes 5–35 mol %, and $P_2O_5$ is present up to 85 mol %; and $PbO+R_2O+B_2O_3+P_2O_5 \geq 95$ mol %, wherein PbO comprises 5–30 mol %, $R_2O$ constitutes 5–30 mol %, $B_2O_3$ comprises 5–20 mol %, and $P_2O_5$ makes up 15–85 mol %.

U.S. Pat. Nos. 3,885,973, 3,935,018, 3,964,919 and 3,926,649 disclose glasses which may be suitable for co-pressing with organic polymers to form composite articles of the type discussed in detail in U.S. Pat. No. 3,732,181, supra.

Recently, U.S. Pat. No. 5,043,369, herein incorporated by reference in its entirety, has disclosed a glass/polymer blend wherein the glass phase and the polymer phase being simultaneously enclosed within larger regions of another phase (i.e., localized phase inversion/reversal.) In this patent, the glass and polymer demonstrate at least partial miscibility and/or a reaction therebetween such that the two components are intimately blended together. The blend results in the formation of a compatibilizing component in-situ to yield an alloy. Also, the glass/polymer blend of this reference exhibits an essentially uniform, fine-grained microstructure wherein the glass and polymer elements comprising the microstructure are of relatively uniform dimensions. The reference patent discloses a phosphate-based glass within two general narrow composition regions which are essentially non-hygroscopic and exhibit good resistance to chemical and moisture attack, and which can interact with a variety of polymers to produce alloy articles.

Most recently, U.S. Pat. No. 6,103,810, herein incorporated by reference, has disclosed a glass/polymer blend comprised of low-temperature softening glasses and a plurality of high temperature aromatic thermoplastic or thermosetting polymers that can be used to produce durable, dimensionally stable and injection moldable articles. Also disclosed therein are glass/polymer blends that exhibit essentially uniform, fine-grained microstructure in which preferably, the glass and polymer elements comprising the microstructure are of relatively uniform dimensions, and in which the glass interacts with the polymers to form alloys exhibiting a combination of the desirable properties of the glass and the polymers. In one particular aspect, the patent discloses a glass/polymer blend containing at least two high-temperature polymers, preferably using a mixed-alkali-zinc-pyrophosphate glass, resulting in a blend that exhibits excellent mechanical properties and flame retardance.

With regard to low-temperature glasses particularly suitable for compounding with high-temperature polymers, U.S. Pat. No. 4,940,677 discloses zinc-containing phosphate glass compositions exhibiting a glass transition temperature below 450° C., a working temperature below 500° C., and excellent resistance to attack by water and mild aqueous alkaline solutions. The glasses consist essentially, in mole percent, of at least 65% total of 23–55% ZnO, 28–40% $P_2O_5$, and 10–35% $R_2O$, wherein $R_2O$ consists of at least two a metal oxides in the indicated proportions selected from the group consisting of 0–25% $Li_2O$, 1–25% $Na_2O$, and 0–25% $K_2O$, and up to 35% total of optional ingredients. Method of producing the glasses is also provided in this patent.

In search for the ideal low-temperature glasses and glass/polymer blends containing the same, the present inventor has found that matching of the viscosity of the glass and polymers at the processing temperature are of great importance for an intimate blending of the glass and the polymer. Glass transition temperature is customarily defined as the temperature at which increases in specific heat and coefficient of thermal expansion take place with an accompanying sharp drop of viscosity. This temperature is frequently deemed to lie in the vicinity of the glass annealing point. Working temperature of a glass is customarily defined as the temperature at which the glass demonstrates a viscosity of about $10^4$–$10^7$ poises. Glass transition temperature is a useful parameter for measuring the complete viscosity versus temperature curve of a glass and, in turn, indicates the temperature at which the glass may be compounded with a polymer. For a glass to have a stable viscosity to achieve a successful compounding with polymers, it is desired that the glasses produced from successive melts of the same batch composition have substantially the same glass transition temperature.

The present inventor has discovered that generally the tin-containing zinc phosphate glasses do not have a substantially stable $T_g$. As a result, glasses produced from the same batch composition in different melts cannot always be used for compounding with the same polymer. Without intending to be bound by a theory, the present inventor believed that this is the result of tin oxide used in the starting materials, which is in +2 valence status, being oxidized to +4 valence in different proportions in different melts during the glass melting process. It is known that oxidation of tin from +2 valence to +4 valence increases the $T_g$ of the glass. As such, glasses from different melts were subject to difficulty in compounding with polymers, or lead to inconsistent properties of glass/polymer blends containing them.

One way to solve this $T_g$ fluctuation problem of tin-containing zinc phosphate low-temperature glasses is to add reducing agents into the batch materials to prevent or inhibit oxidation of tin oxide. Such reducing agents commonly used include ammonium phosphate, charcoal, sugar, starch, or any mixture thereof. However, use of such reducing agents, though helpful, could not eliminate completely oxidation of tin oxide, and hence, the $T_g$ fluctuation problem. Moreover, effective amount of reducing agents was difficult to control in practical production. For example, exceeding amount of reducing agent, such as charcoal, reduces the quality of the final glass product, and renders it undesirable to be compounded with polymers. Charcoal also tends to float on the top of the batch materials during the melting, adding to the difficulty of processing. As for ammonium phosphate, it is known to be particularly hazardous for platinum melting and delivery system because of the corrosive effect of its decomposition product during the melting process, thereby rendering it undesirable for industrial application.

As such there remains a need for tin-free low-temperature zinc phosphate glasses suitable for forming blends with polymers, that exhibit reproducible stable $T_g$ from melt to melt from the same batch composition, and a high water durability.

SUMMARY OF THE INVENTION

In one aspect, the present invention provides a glass consisting essentially, expressed in terms of mole percent on the oxide basis, of 31–34% $P_2O_5$, 0–2% $Al_2O_3$, 5–11% $Li_2O$, 5–13% $Na_2O$, 3–7% $K_2O$, with $Li_2O+Na_2O+K_2O$ being 10–28%, 20–45% ZnO, 0–10% CaO, 0–10% BaO, 0–10% SrO, with CaO+BaO+SrO being 3–12%, and 0–2% $SiO_2$, said glass exhibiting a stable glass transition temperature below 450° C., a working temperature below 500° C., and a water durability of no more than $5\times10^{-7}$ g/cm$^2$/min after immersion in water at 95° C. for 24 hours. Preferably, the low-temperature glass of the present invention consists essentially, expressed in terms of mole percent on the oxide basis, of 32.5–34% $P_2O_5$, 0.7–1.7% $Al_2O_3$, 7–11% $Li_2O$, 9–13% $Na_2O$, 4–6% $K_2O$, with $Li_2O+Na_2O+K_2O$ being 23–26%, 27–34% ZnO, 1–6% CaO, 0–8% BaO, 0–8% SrO, with SrO+BaO$\leq$8% and CaO+BaO+SrO being 3–12%, and 0–2% $SiO_2$. This glass composition can further advantageously comprise 0.5–5%, preferably 1–2.5% of fluorine, expressed in terms of weight percent of the melted glass. The fluctuation range of the $T_g$ of the glass of the present invention is within ±5° C., preferably within ±2° C., most preferably within ±1° C. of its target $T_g$.

In another aspect, the present invention provides a glass/polymer blend of a low temperature glass and a high-temperature polymer, said glass exhibiting a stable glass transition temperature below 450° C., a working temperature below 500° C., a water durability of no more than $5\times10^{-7}$ g/cm$^2$/min after immersion in water at 95° C. for 24 hours, said glass consisting essentially, expressed in terms of mole percent on the oxide basis, of 31–34% $P_2O_5$, 0–2% $Al_2O_3$, 5–11% $Li_2O$, 5–13% $Na_2O$, 3–7% $K_2O$, with $Li_2O+Na_2O+K_2O$ being 10–28%, 20–45% ZnO, 0–10% CaO, 0–10% BaO, 0–10% SrO, with CaO+BaO+SrO being 3–12%, and 0–2% $SiO_2$. The polymer can be selected from the group consisting of (i) polyphenylene sulfides, polyfluoro resins, polyetherimides, liquid crystal polyesters, polysulfones, polyarylsulfones, polyphenylsulfones, polyethersulfones, polytetrafluoroethylene, high temperature polycarbonates, polyimides, aromatic polyether ketones, and mixtures, copolymers, and other combinations thereof; and (ii) epoxy resins, phenolics, diallyl phthalates, silicone resins, polyimides, and mixtures, copolymers, and other combinations thereof. Preferably, the low-temperature glasses consist essentially, expressed in terms of mole percent on the oxide basis, of 32.5–34% $P_2O_5$, 0.7–1.7% $Al_2O_3$, 7–11% $Li_2O$, 9–13% $Na_2O$, 4–6% $K_2O$, with $Li_2O+Na_2O+K_2O$ being 23–26%, 27–34% ZnO, 1–6% CaO, 0–8% BaO, 0–8% SrO, with SrO+BaO$\leq$8% and CaO+BaO+SrO being 3–12%, and 0–2% $SiO_2$. This glass composition can further advantageously comprise 0.5–5%, preferably 1–2.5% of fluorine, expressed in terms of weight percent of the melted glass.

The present inventive glass and the glass-polymer blend containing the same result in a number of advantages over the prior art. For example, the low-temperature glasses of the present invention are particularly suitable for compounding with high-temperature thermoplastic and/or thermosetting polymers, and the resulted glass-polymer blend has consistent structures and properties.

Additional feature and advantages of the present invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview of framework to understanding the nature and character of the invention as it is claimed.

The accompanying drawing is included to provide a further understanding of the invention, and is incorporated in and constitutes a part of this specification. The drawing illustrates one or more embodiment(s) of the invention, and together with the description serves to explain the principles and operation of the invention.

DETAILED DESCRIPTION OF THE INVENTION

Figure 1:
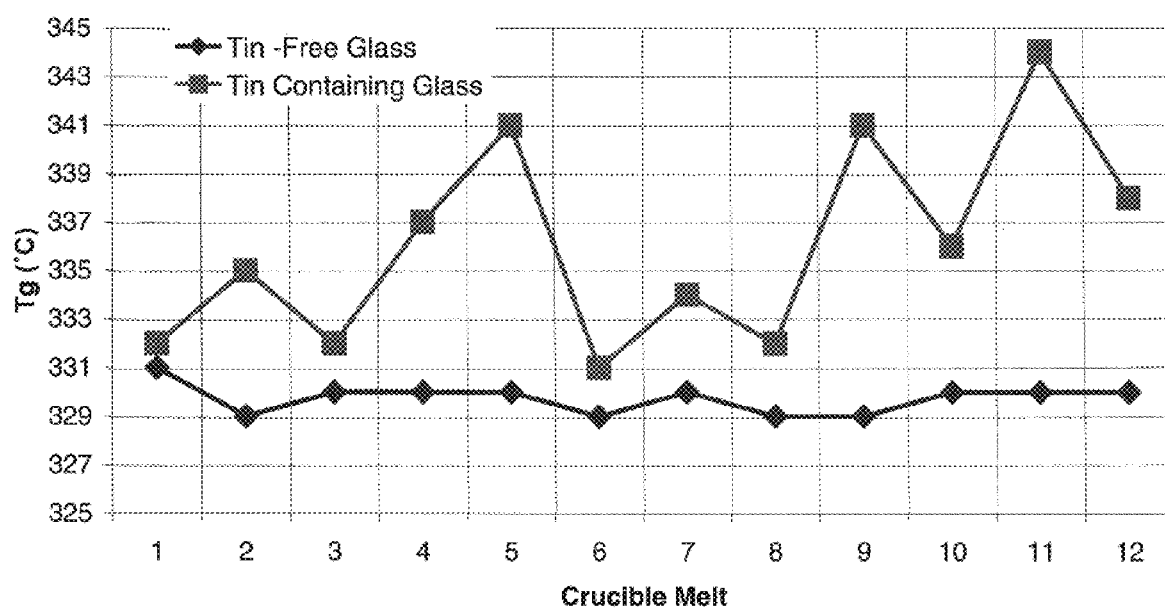
FIG. 1 illustrates the glass transition temperatures of a tin-free zinc phosphate glass of the present invention in comparison to a tin-containing zinc phosphate glass in different crucible melts.

As used herein, a stable $T_g$ means, as measured by methods known in the art, inter alia, differential scanning calorimetry, the fluctuation range of the glass transition temperatures of glasses prepared from the same batch composition melt after melt is within ±5° C., preferably within ±2° C., most preferably within ±1° C. of the target $T_g$.

$P_2O_5$ is the primary glass former in the low-temperature glass composition of the instant invention. Its tendency to form linear molecular structures, in contrast to the 3-D networks typical in silicate glasses, offers an explanation for the low melting and transition temperatures of the present inventive glass. The level of $P_2O_5$ affects water durability of the glass. Where $P_2O_5$ content is higher than 34%, the glass will have a less than satisfactory water durability. However on the other hand, where the $P_2O_5$ level is below 31%, the glass divitrifies too easily to be suitable for compounding with polymers intimately at the working temperature. $P_2O_5$ level of the present inventive low-temperature glasses is preferably between 32.5–34 mol %.

Alkali metal oxides are modifiers in the zinc phosphate glasses of the instant invention, as they are in other glass systems. Sodium and mixed alkali zinc pyrophosphate glasses are quite stable. Mixed alkali metal oxides are preferred for the low-temperature glasses of the present invention because they have a pronounced effect on the stability of the resultant glasses. The best glasses for durability over a wide pH ranges are obtained from relatively high level of lithia (about 10 mol %). However, devitrification during compounding and molding can result. Lower lithia levels (about 6 mol %) produces stable glasses with some compromise in durability. In zinc phosphate glasses, surprisingly, alkali levels over 10 mol % improve chemical durability. Alkali levels in excess of 28 mol % produce lower chemical resistance. Based on this principle, the present inventive glasses have been determined to comprise 5–11% $Li_2O$, 5–13% $Na_2O$, 3–7% $K_2O$, with $Li_2O+Na_2O+K_2O$ being 10–28%, and preferably contains 7–11% $Li_2O$, 9–13% $Na_2O$, 4–6% $K_2O$, with $Li_2O+Na_2O+K_2O$ being 23–26%.

The combination of ZnO and/or other divalent metal oxides with alkali in pyrophosphate compositions is beneficial in developing useful glasses with working temperatures as low as 350° C., good glass stability for compounding and molding processes, and water durability generally equivalent to (or in some cases better than) soda lime glasses. The present inventive glasses contain ZnO at a level of 20–45 mol %, preferably 27–34 mol %. Alkaline earth metal oxides can be added to the present inventive glasses as a substitute for ZnO with increases in durability and $T_g$. Addition of calcium and/or barium improves durability with little change of $T_g$ of the glasses, and the use of a combination of calcium and barium improves glass stability. As such, it has been determined that the present inventive glasses contain 0–10% CaO, 0–10% BaO, 0–10% SrO, with CaO+BaO+SrO being 3–12%. Preferably, the present inventive glasses contain 1–6% CaO, 0–8% BaO, 0–8% SrO, with SrO+BaO$\leq$8% and CaO+BaO+SrO being 3–12%.

Alumina is a minor glass former that improves durability, particularly in resistance to boiling water, steam, and acid. The mole percentage range of alumina in the present inventive glasses is 0–2%, preferably 0.7–1.7%. Higher alumina increases $T_g$ and promotes crystallization, both leading to difficulty in compounding and extrusion; lower levels introduce long-term hydration effects.

Silica, although normally considered a glass former, is thought to be a modifier in pyrophosphate glasses. Levels up to 3 mol % have proven useful in reducing devitrification and preventing coalescence of glass droplets in polymer blends. These effects may be due to surface tension influences. Silica has little effect on $T_g$ or durability. In any event, the solubility of silica in pyrophosphate glasses is low, less than 5 mol %, and haze and opalization is often produces at high levels. Accordingly, silica levels in the present inventive glasses are 0–2%, preferably 0–1% by mole.

No tin is present in the glasses of the instant invention. As discussed supra, this makes the $T_g$ of the glasses more reproducible melt-to-melt, but raises the $T_g$ relative to a reduced tin glass. However, the elimination of tin from the glass compositions makes it possible to adjust the $T_g$ of the glasses toward a target $T_g$ without an unacceptable fluctuation thereof by modifying levels of other ingredients in the glasses that are capable of changing the $T_g$.

One or more fluorine-containing materials can be added to the batch materials, including, but not limited to, alkali metal fluorides and alkaline earth metal fluorides. Fluorine added to the batch materials is able to be volatized during the melting process, therefore the fluorine level in the melted glass may be slightly different that that calculated from the batch. Addition of fluoride to the glasses lowers the $T_g$ with little effect on the durability, unlike chlorine, the addition of which lowers both $T_g$ and durability. Fluorine also lowers the β-hydroxyl groups in the dry glass, which is important for compounding with a polymer, especially a polyester, because the hydroxyl groups can be released at the compounding temperatures (above 350–390° C.), then hydrolyze and decompose the polymer. If $T_g$ is too high, or if it fluctuates more than ±5° C. from a target $T_g$ over successive melts, it becomes difficult to consistently compound the polymer and the glass, resulting in variation in microstructure of the compounded material, and, in turn, leading to inconsistent properties of the compounded material. Therefore, fluorine can be added to the present inventive glasses, in the range of 0–5%, preferably 1–2.5%, expressed in terms of weight percent of the glass compositions.

The fully oxidized nature of the present inventive glasses permits the glasses to be batched without using reducing agents. Prior tin-containing glasses often could only be melted in silica crucibles with non-platinum tools because ammonium phosphate had to be used. Ammonuim phosphate decomposed and attached platinum during the melting process. Adding effective amount of reducing agent is a difficult task. Exceeding the requisite amount of reducing agent, for example, charcoal, will reduce the quality of the final glass product, and render it undesirable to be compounded with polymers. Charcoal also tends to float on the top of the batch materials during the melting, adding to the difficulty of processing. The glasses of the present invention can be melted and delivered in conventional platinum melting systems, including platinum crucibles, stirrers, delivery systems, and the like, without the need to use reducing agents. This is great benefit in the ability of glass manufacturers to produce melts of developmentally or commercially viable size in existing melters.

TABLE I records a number of glass compositions. Glasses 1–5 are examples operable in the present invention, whereas glasses C1, C2, C3, C4 and C5 represent tin-containing glasses and are included for comparative purposes. The actual batch ingredients for the glasses can comprise any materials, either oxides or other compounds, which, upon being melted together, will be converted into the desired oxides in the proper proportions. For example, $Li_2CO_3$ is conveniently employed as the source of $Li_2O$. Alkaline metal fluorides and alternatively alkaline earth fluorides can be used as the source of fluoride in the glasses. Fluoride contents reported in TABLE I are analyzed weight percent of the melted glasses. Data reported for examples 1–3 are analyzed weight percent for resultant glasses, while data for examples 4, 5, C1, C2, C3, C4 and C5 are mole percent calculated from batch materials. TABLE I also shows that for glasses of examples C2, C3, C4 and C5, reducing agents charcoal and ammonium phosphate were used in the melting process, while in examples 1–5 and C1, no reducing agent was used at all during the melting.

The batch materials were compounded, ballmilled together to aid in securing a homogeneous melt, and then charged into silica crucibles. After placing lids thereon, the crucibles were introduced into a furnace operating at about 1000° C. and maintained at that temperature for about 4 hours. Each melt was poured into a steel mold to produce a rectangular glass slab having dimensions of about 8"×4"× 0.5" and the glass slab annealed overnight at 300° C.

Working temperature of the glasses were determined by methods known in the art, such as the method disclosed in U.S. Pat. No. 4,940,677, incorporated herein by reference.

Water durability of the glasses was measured using a method as described below. High water durability of the glasses is desired. To measure water durability of the glasses, specimens were pre-cleaned where necessary. Pre-cleaned specimens were oven dried at 140° C. for 45 minutes, then desiccated before weighing. During the testing, the pre-cleaned and dried specimens were immersed in 250 mL 95° C. deionized water in preleached Teflon bottles for 24 hours. Upon completion of testing, all specimens were flood rinsed with deionized water, then dried at 140° C. and desicated before final weighing. The glasses of examples 1–5 exhibited a water durability of no more than $5 \times 10^{-7}$ g/cm$^2$/min.

The $T_g$ of the glass was measured utilizing standard differential scanning calorimetry techniques. For each sample of the glass, $T_g$ was measured multiple times, then an average value thereof was calculated. Average $T_g$, $T_g$ range, and standard deviation of the $T_g$ data are reported in TABLE I.

Levels of β-hydroxyl in glasses 1–3 provided in TABLE I were measured utilizing the method described in Geotti-Bianchini, F. et al., "Recommended procedure for the IR spectroscopic determination of water in soda-lime-silica glass, Report of the ICG Technical Committee 14 "Gases in Glass". *Glastech. Ber. Glass Sci. Technol.* 72, (1999) no. 4, pp. 103–111. Polished wafers of the glasses were prepared for testing. Tests were carried out using a FTIR spectrometer.

Whereas the above description reflects laboratory melting and forming practice only, it will be appreciated that the recited compositions are capable of being melted in large scale melting units and shaped into desired configurations utilizing techniques conventional in the glass-making art.

glass of example 5 has a much narrower $T_g$ range of 2° C. in different melts. Glass transition temperatures of 12 melts for glasses of examples 5 and C1 are provided in FIG. 1, which clearly demonstrates that the tin-free glasses of the present invention had a much more stable $T_g$ compared to the tin-containing glasses.

Experiments showed the zinc phosphate glasses of the present invention had a stable $T_g$ under 450° C., a working temperature under 500° C., a water durability of no more than $5 \times 10^{-7}$ g/cm$^2$/min after immersion in water at 95° C. for 24 hours.

The high resistance to water of the present inventive glasses renders them eminently suitable for a wide range of applications including, for example, food service, electronic devices, optical and ophthalmic lenses, and coatings for optical waveguides. Furthermore, because the viscosity relationships exhibited by the inventive glasses at relatively low temperatures render them capable of being shaped into articles of complex configurations through extrusion, injection molding, and other techniques conventionally employed in the plastic forming art, the range of products for which the inventive glasses are useful is greatly broadened.

Due to the stable $T_g$, low working temperature and high water resistance, the present inventive glasses are particularly useful for compounding with high-temperature polymers to produce glass/polymer blends. Such polymers can be thermoplastic or thermosetting. Non-limiting examples of the high-temperature thermoplastic polymers that can be compounded with the present inventive glasses include polyphenylene sulfides, polyfluoro resins, polyetherimides, liquid crystal polyesters, polysulfones, polyarylsulfones,

TABLE I

| | Analyzed wt % | | | Batched mol % | | | | | | |
|---|---|---|---|---|---|---|---|---|---|---|
| Oxide | 1 | 2 | 3 | 4 | 5 | C1 | C2 | C3 | C4 | C5 |
| $P_2O_5$ | 46.1 | 46.2 | 46.3 | 32 | 32.5 | 33 | 32.5 | 32.5 | 33 | 33 |
| $Al_2O_3$ | 1.02 | 1.03 | 1.01 | 2 | 1 | 2 | 1.5 | 1.5 | 1.5 | 2 |
| $Li_2O$ | 2.71 | 2.71 | 2.72 | 9 | 9 | 6.9 | 7 | 7 | 7 | 7 |
| $Na_2O$ | 6.73 | 6.73 | 6.77 | 11 | 11 | 8 | 8 | 8.5 | 8.5 | 8 |
| $K_2O$ | 4.52 | 4.57 | 4.56 | 5 | 5 | 4.8 | 5 | 5 | 5 | 5 |
| ZnO | 25.2 | 25.2 | 25.3 | 31 | 30.5 | 39.9 | 41 | 40.5 | 40 | 40 |
| CaO | 2.28 | 2.28 | 2.29 | 4 | 4 | | | | | |
| BaO | 9.24 | 9.27 | 9.26 | 6 | 6 | | | | | |
| SrO | 0.060 | 0.062 | 0.061 | | | | | | | |
| F | 1.02 | 1.11 | 1.12 | | | | | | | |
| $SiO_2$ | 0.78 | 0.65 | 0.61 | 1 | 1 | | | | | |
| SnO | | | | | | 5.4 | 5 | 5 | 5 | 5 |
| Reducing Agent | | | None | | | | Charcoal + Ammonium Phosphate | | | |
| Average $T_g$ (° C.) | — | 330 | 328 | 328 | 330 | 336.8 | 335.25 | 334 | 335 | 334 |
| $T_g$ Range (° C.) | — | 2 | 2 | — | 2 | 13 | 6 | 4 | 2 | 4 |
| Standard Deviation (° C.) | — | 0.8 | 0.8 | — | 0.8 | 5.2 | 2.5 | 1.8 | 1 | 1.8 |
| β-OH (mm$^{-1}$) | 0.335 | 0.313 | 0.362 | — | — | — | — | — | — | — |

As can be seen from TABLE I, glass C1, which was melted without the presence of reducing agents, had a wide fluctuation range of $T_g$ of 13° C. This range is unacceptable for the glasses produced melt-to-melt to be compounded with polymers successfully. In melting tin-containing glasses C2–C5, reducing agents, charcoal and ammonium phosphate here, were added. However, as demonstrated by the $T_g$ range data, $T_g$ fluctuation in most cases were still considerably high. Whereas the present inventive tin-free polyphenylsulfones, polyethersulfones, polytetrafluoroethylene, high temperature polycarbonates, polyimides, aromatic polyether ketones, and mixtures, copolymers, and other combinations thereof. Non-limiting examples of aromatic polyether ketones include polyetherketones (PEK), polyetherketoneketones (PEKK), polyetherketoneetherketonketones (PEKEKK), polyetheretherketoneketones (PEEKK), polyetheretherketoneetherketones (PEEKEK), polyetheretheretherketones (PEEEK) and polyetheretherketones (PEEK). Non-limiting examples of high-temperature thermosetting polymers include epoxy resins, phenolics, diallyl phthalates, silicone resins polyimides, and mixtures, copolymers, and other combinations thereof. The most suitable glass/polymer combination may be determined by experimentation. Multiple polymers may be used to blend with the present inventive glasses, with one or more polymers used as processing aids. Choices of high-temperature polymers to be blended with low-temperature glasses are described in, for example, U.S. Pat. No. 6,103,810, which is incorporated herein by reference.

The high-temperature polymers can be blended with the low-temperature glasses of the present invention using any method known in the art. Preferably, the glass/polymer blends are made by conventional twin screw extrusion compounding and pelletizing. The design of the extruder and processing conditions, for example, feed rate, screw speed, barrel and die temperatures, vary according to the polymer used and the desired microstructure of the blend, which can be either small beads, beads and fibers, or beads, fibers and ribbons. In one embodiment, the glass was fed as a coarse granular powder of a particle size between 0.1 to 1 mm. The polymer or polymers were fed as pellets or powder. Gravimetric feeders were used. The screw design and processing conditions were adjusted to meet with the needs of the polymer and the desired microstructure of the blend. Methods of producing glass/polymer blends are described in, for example, U.S. Pat. No. 6,103,810, incorporated herein by reference.

The glass/polymer blends of the present invention enjoy the following advantageous physical properties: high dimensional stability, high mechanical strength and flame retardance. By choosing different glass compositions, polymers used, proportion therebetween, and processing conditions, products with different properties can be obtained.

It is to be understood that the above description of the present invention may be altered or modified without departing from the scope and spirit of the appended claims.

What is claimed is:

1. A tin-free zinc phosphate glass consisting essentially, expressed in terms of mole percent on the oxide basis, of 32.5–34.0% $P_2O_5$, 0.7–1.7% $Al_2O_3$, 7–11% $Li_2O$, 9–13% $Na_2O$, 4–6% $K_2O$, with $Li_2O+Na_2O+K_2O$ being 23–26%, 27–34% ZnO, 1–6% CaO, 0–8% BaO, 0–8% SrO, and 0–1% $SiO_2$, with SrO+BaO being no more than 8%, said glass exhibiting a stable glass transition temperature $T_g$ below 450° C. that fluctuates within ±5° C. of the target $T_g$ in different melts, a working temperature below 500° C., and a water durability of no more than $5 \times 10^{-7}$ g/cm$^2$/min after immersion in water at 95° C. for 24 hours.

2. A glass according to claim 1 further comprising, expressed in terms of weight percent of the glass, 0.5–5% F.

3. A glass according to claim 2, wherein the fluorine content is 1–2.5%, expressed in terms of weight percent of the glass.

4. A glass according to claim 2 or 3, wherein the β-hydroxyl value of the melted glass is less than 0.500 mm$^{-1}$.

5. A glass according to claim 4, wherein the β-hydroxyl value of the melted glass is less than 0.400 mm$^{-1}$.

6. A glass/polymer blend comprising at least one high-temperature polymer and a tin-free glass exhibiting a stable glass transition temperature $T_g$ below 450° C. that fluctuates within ±5° C. of the target $T_g$ in different melts, a working temperature below 500° C., a water durability of no more than $5 \times 10^{-7}$ g/cm$^2$/min after immersion in water at 95° C. for 24 hours, said glass consists essentially, expressed in terms of mole percent on the oxide basis, of 32.5–34% $P_2O_5$, 0.7–1.7% $Al_2O_3$, 7–11% $Li_2O$, 9–13% $Na_2O$, 4–6% $K_2O$, with $Li_2O+Na_2O+K_2O$ being 23–26%, 27–34% ZnO, 1–6% CaO, 0–8% BaO, 0–8% SrO, and 0–2% $SiO_2$, with SrO+BaO being no more than 8%.

7. A glass/polymer blend according to claim 6, wherein the glass further comprises, expressed in terms of weight percent of the glass, 0.5–5% F.

8. A glass/polymer blend according to claim 7, wherein the fluorine content is 1–2.5%, expressed in terms of weight percent of the glass.

9. A glass/polymer blend according to claim 6, wherein the high-temperature polymer is selected from the group consisting of (i) polyphenylene sulfides, polyfluoro resins, polyetherimides, liquid crystal polyesters, polysulfones, polyarylsulfones, polyphenylsulfones, polyethersulfones, polytetrafluoroethylene, high temperature polycarbonates, polyimides, aromatic polyether ketones, and mixtures, copolymers, and other combinations thereof; and (ii) epoxy resins, phenolics, diallyl phthalates, silicone resins, polyimides, and mixtures, copolymers, and other combinations thereof.

* * * * *